US009822762B2

United States Patent
Kooijman et al.

(10) Patent No.: US 9,822,762 B2
(45) Date of Patent: Nov. 21, 2017

(54) SYSTEM AND METHOD FOR OPERATING A WIND TURBINE

(71) Applicant: General Electric Company, Schenectady, NY (US)

(72) Inventors: Henk-Jan Kooijman, Enschede (NL); Neils Chris Schmitt, Clifton Park, NY (US); Kapil Dagg, Bangalore (IN)

(73) Assignee: General Electric Company, Schenectady, NY (US)

( * ) Notice: Subject to any disclaimer, the term of this patent is extended or adjusted under 35 U.S.C. 154(b) by 525 days.

(21) Appl. No.: 14/104,217

(22) Filed: Dec. 12, 2013

(65) Prior Publication Data

US 2015/0167637 A1  Jun. 18, 2015

(51) Int. Cl.
*F03D 7/02* (2006.01)
*F03D 7/04* (2006.01)

(52) U.S. Cl.
CPC .......... *F03D 7/0292* (2013.01); *F03D 7/02* (2013.01); *F03D 7/048* (2013.01); *F05B 2270/1095* (2013.01); *F05B 2270/331* (2013.01); *Y02E 10/723* (2013.01)

(58) Field of Classification Search
CPC ..... Y02E 10/723; F03D 7/0292; F03D 7/048; F03D 7/043; F03D 1/003; F03D 7/028; F03D 7/0288; F05B 2270/332; F05B 2270/322; F05B 2260/821; F05B 2270/1095; F05B 2270/404; F05B 2270/1033; F05B 2270/32;

(Continued)

(56) References Cited

U.S. PATENT DOCUMENTS 8,202,048 B2 * 6/2012 Stiesdal ................ F03D 7/0224
                                                    416/1
8,319,364 B2 * 11/2012 Nakayama ............. F03D 17/00
                                                    290/44
2009/0088991 A1  4/2009 Brzezowski et al.

(Continued)

FOREIGN PATENT DOCUMENTS

DE          EP 2302207 A1 *  3/2011    ........... F03D 7/0264
EP            2 302 207 A1    3/2011
WO       WO 2008/124185 A1   10/2008

OTHER PUBLICATIONS

Obdam, T.S., L.W.M.M. Rademakers, H. Braam. Flight Leader Concept for Wind Farm Loading Counting: Final Report. In: ECN-E-09-068, Oct. 2009.*

*Primary Examiner* — Sean Shechtman
*Assistant Examiner* — Shon Foley
(74) *Attorney, Agent, or Firm* — Dority & Manning, P.A.

(57) ABSTRACT

The present subject matter is directed to a system and method for operating a wind turbine. The method includes determining an actual operating time for one or more wind turbine components at multiple power levels; determining a corresponding wind condition for each of the operating times at each power level; estimating a loading condition acting on the one or more wind turbine components at the multiple power levels and the corresponding wind conditions; estimating an accumulated fatigue life consumption of the one or more wind turbine components based at least partially on the operating times and the estimated loading conditions; and, operating the wind turbine based on the accumulated fatigue life consumption.

18 Claims, 6 Drawing Sheets

(58) Field of Classification Search
CPC ........ F05B 2270/3201; F05B 2270/321; H02J 3/386; Y02B 10/30
USPC ............................. 700/290, 287; 290/44, 55
See application file for complete search history.

(56) References Cited

U.S. PATENT DOCUMENTS

| | | | |
|---|---|---|---|
| 2009/0180875 A1* | 7/2009 | Egedal | F03D 7/0292 416/43 |
| 2010/0133819 A1* | 6/2010 | Kinzie | F03D 7/0224 290/44 |
| 2010/0298995 A1* | 11/2010 | Zhang | F03D 7/0292 700/287 |
| 2011/0123331 A1* | 5/2011 | Stiesdal | F03D 7/0292 416/1 |
| 2013/0156577 A1 | 6/2013 | Esbensen et al. | |
| 2013/0338938 A1* | 12/2013 | Coultate | F03D 1/003 702/35 |
| 2014/0288855 A1* | 9/2014 | Deshpande | F03D 17/00 702/34 |
| 2015/0003983 A1* | 1/2015 | Coultate | F03D 7/0292 416/1 |

\* cited by examiner

SYSTEM AND METHOD FOR OPERATING A WIND TURBINE

FIELD OF THE INVENTION

The present subject matter relates generally to wind turbines and, more particularly, to a system and method for operating a wind turbine based on a fatigue life consumption of the wind turbine or one of more of its individual components.

BACKGROUND OF THE INVENTION

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity.

Typically, wind turbines are designed to operate at a rated power output over a predetermined or anticipated operating life. For instance, a typical wind turbine is designed for a 20-year life. However, in many instances, this anticipated operating life is limited or based on the anticipated fatigue life of one or more of the wind turbine components. For instance, FIG. 1 illustrates example data for a conventional wind turbine having an anticipated fatigue life (the end of such time period being indicated by line 50). As shown, the projected calculated cumulative fatigue damage is represented by line 52, whereas the actual cumulative fatigue damage is represented by line 54. The projected cumulative fatigue damage 52 may be linear or non-linear with respect to time depending upon the component and maintenance practices. For example, as shown, the projected cumulative fatigue damage 52 is linear from time $T_0$ to $T_1$ and $T_3$ to $T_4$, whereas the projected cumulative fatigue damage 52 is substantially non-linear from $T_1$ to $T_3$. The non-linear portions may be caused from a variety of varying wind conditions and/or operation curtailment. For example, the projected cumulative fatigue damage 52 between $T_1$ to $T_2$ may have been caused by a wind boost or a power up, whereas the projected cumulative fatigue damage 52 between $T_2$ to $T_3$ may have been curtailed by an operator or grid.

The actual cumulative fatigue damage is typically less than the projected cumulative fatigue damage due, at least in part, to the following: (1) conservative design assessment of the site wind conditions (e.g. mean wind speed and effective turbulence intensity), (2) non-operating hours that were not considered as part of the site assessment, and (3) experience gained over time of the true load carrying capabilities of the component material and structure. It should be understood that the terms "turbulence intensity," "turbulence," "turbulence intensity level" and/or similar terms may be used herein interchangeably.

The difference between the projected cumulative fatigue damage 52 and the actual cumulative fatigue damage 54 is illustrated by space 55. As such, knowing the accurate fatigue life consumption allows an operator to determine a remaining economic value or fatigue reserve of the wind turbine at any point in time. Thus, if the actual cumulative fatigue damage 54 is less than the projected cumulative fatigue damage 52, as indicated by the space 55 of FIG. 1, the operator can operate the wind turbine beyond the design life 50 depending on the estimated fatigue life consumption. For example, as shown in FIG. 1, the remaining fatigue life reserve at the end of the life of the wind turbine is represented by dimension 56. Similarly, and referring now to FIG. 2, if the actual cumulative fatigue damage 54 is greater than the projected cumulative fatigue damage 52 (as indicated by space 55), then the operator can operate the wind turbine less than the design life 50 (as indicated by line 57 at time $T_1$) or in a manner to achieve the design life 50, depending on the estimated fatigue life consumption.

The fatigue life consumption of the wind turbine as used herein is the life of the wind turbine that has been consumed or exhausted by previous operation. The fatigue life consumption should be determined not only by the number of elapsed years or cycles since the wind turbine has been in operation, but also by the cumulative operating hours of the wind turbine at different turbine operating states. The terms "operating hours," "available hours," or similar are meant to encompass the hours spent in any of the various operational modes of the wind turbine, whereas the terms "non-operating hours," or "non-available hours" are the hours where the wind turbine is shut down (e.g. due to servicing, replacement of components, scheduled shut-downs, etc.). Further, the term "idling hours" is meant to encompass the operating and/or available hours that the wind turbine operates at wind speeds below cut-in wind speeds or when the unit is curtailed by the operator.

Conventional wind turbines have implemented various control technologies to estimate the fatigue life consumption and therefore curtail fatigue loads. For example, various systems utilize a plurality of sensors to detect loads acting on the wind turbine and limits turbine operation accordingly. More specifically, for certain wind conditions, the system may decrease the output power level of the wind turbine for certain wind speeds to reduce the loads acting on the wind turbine. Another system simply shuts down the wind turbine when wind speeds exceed a certain value.

In addition, European Patent Application EP 2 302 207 entitled "Power Generating Machine Load Control Based on Consumed Fatigue Life Time and Real-Time of Operation of a Structural Component" dated Sep. 23, 2009 discloses a control technology that estimates consumed fatigue life time by detecting a load cycle of a wind turbine component. More specifically, the method determines a consumed fatigue life time of a wind turbine component based on the load cycles of the component and a real-time of operation of the component (i.e. how long the turbine has been in commission), compared to the fatigue life time with the real-time of operation, and controls the wind turbine accordingly.

Such control technologies, however, are inefficient at accurately and reliably predicting the fatigue life consumption. More specifically, previous systems and methods do not consider cumulative operating hours of the wind turbine at different wind turbine operating states (e.g. power levels) when estimating fatigue life consumption. As such, current control strategies may lead to a sub-optimal Net-Present-Value (NPV) of the wind turbine when compared to a wind turbine where fatigue curtailment can be postponed until a later date (i.e. the revenue stream is not lowered as quickly). Further, the sensors associated with conventional control systems add additional costs and may fail during operation of the wind turbine, thereby providing unreliable data for determining actual fatigue life consumption.

Accordingly, an improved system and method for operating a wind turbine based on fatigue life consumption would be desired in the art. For instance, a system and method for operating a wind turbine that estimates the fatigue life consumption based on cumulative operating hours at different power levels combined with wind direction would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for operating a wind turbine. The method includes determining an actual operating time for one or more wind turbine components at multiple power levels; determining a corresponding wind condition for each of the operating times at each power level; estimating a loading condition acting on the one or more wind turbine components at the multiple power levels and the corresponding wind conditions; estimating an accumulated fatigue life consumption of the one or more wind turbine components based at least partially on the operating times and the estimated loading conditions; and, operating the wind turbine based on the accumulated fatigue life consumption.

In another embodiment, the step of determining the actual operating time for the wind turbine at multiple power levels further includes determining a number of operating hours that the one or more wind turbine components has operated at each of the multiple power levels. In several embodiments, the wind condition is reflective of a wind direction, air density, turbulence intensity, wind gusts, wind shear, wind speed, wind upflow, or any other similar wind condition.

In still further embodiments, determining the loading condition acting on the one or more wind turbine components at the multiple power levels and the corresponding wind conditions further includes utilizing one or more look-up tables, wherein the one or more look-up tables comprises operating data of the wind turbine. In another embodiment, the method includes estimating a turbulence intensity acting on the one or more wind turbine components based at least partially on one of the multiple power levels and the wind directions. Further, the method may further include estimating the accumulated fatigue life consumption based on the turbulence intensity. In additional embodiments, the method may also include tracking a plurality of loading conditions over a predetermined time period via one or more sensors, determining a variance between the tracked plurality of loading conditions and the estimated loading condition, and calibrating the estimated loading condition to reflect the variance, wherein the variance is reflective of at least one of a fatigue load or an extreme load acting on the wind turbine. In several embodiments, the loading condition acting on the one or more wind turbine components may be reflective of at least one of the following: a wind turbine thrust, a blade loading, a tower loading, a shaft loading, a nacelle loading, a hub loading, a pitch or yaw bearing loading, or similar.

In further embodiments, the step of determining the accumulated fatigue life consumption of the one or more wind turbine components based at least partially on the operating time and the loading condition further includes multiplying the operating time and the loading condition. Further, the step of determining the accumulated fatigue life consumption of the one or more wind turbine components may further include at least one of utilizing sensor data or operating data from an additional wind turbine, wherein the wind turbine and the additional wind turbine are in the same wind farm or an adjacent wind farm. In still another embodiment, the method further may include calibrating the sensor data from the additional wind turbine.

In yet another embodiment, determining the accumulated fatigue life consumption for the one or more wind turbine components based at least partially on the operating times and the loading conditions may further include: multiplying each of the operating times for each power level by the corresponding loading condition to obtain a partial fatigue life consumption; and, adding each of the partial fatigue life consumptions together to obtain the accumulated fatigue life consumption of the one or more wind turbine components.

In another aspect, the present subject matter is directed to a method for determining an accumulated fatigue life consumption of one or more wind turbine components. The method includes determining an actual operating time for the one or more wind turbine components for multiple power levels; determining a corresponding wind direction for the operating times at each power level; determining a loading condition acting on the one or more wind turbine components at the multiple power levels and the corresponding wind conditions; and, estimating the accumulated fatigue life consumption for the one or more wind turbine components based on the actual operating times and the loading conditions.

In a further aspect, the present subject matter is directed to a system for controlling a wind turbine. The system includes a processor configured to: determine an actual operating time for a one or more wind turbine components at multiple power levels; determine a corresponding wind direction for the operating times at each power level; determine a loading condition acting on the one or more wind turbine components at the multiple power levels and the corresponding wind conditions; and, estimate an accumulated fatigue life consumption of the one or more wind turbine components as a function of the operating times and the loading conditions; and, a controller communicatively coupled to the processor, the controller configured to operate the wind turbine based on the accumulated fatigue life consumption.

In a further embodiment, the processor may further include one or more look-up tables configured to estimate the loading condition acting on the one or more wind turbine components, wherein the one or more look-up tables comprises operating data of the wind turbine. In additional embodiments, the method may also include tracking a plurality of loading conditions over a predetermined time period via one or more sensors, determining a variance between the tracked plurality of loading conditions and the estimated loading condition, and calibrating the estimated loading condition to reflect the variance, wherein the variance is reflective of at least one of a fatigue load or an extreme load acting on the wind turbine. In several embodiments, the loading condition acting on the one or more wind turbine components may be reflective of at least one of the following: a wind turbine thrust, a blade loading, a tower loading, a shaft loading, a nacelle loading, a hub loading, a pitch or yaw bearing loading, or similar.

Additionally, the processor may be configured to estimate or measure a turbulence intensity acting on the one or more wind turbine components based at least partially on one of the multiple power levels and the corresponding wind direction. Further, the processor may be configured to estimate the accumulated fatigue life consumption based on the turbulence intensity. In a further embodiment, the processor may be further configured to determine the accumulated fatigue life consumption of the wind turbine as a function of the operating times and the loading conditions by multiplying each of the operating times by the corresponding loading conditions.

In still additional embodiments, the processor may be configured to utilize sensor data or operating data from an additional wind turbine to determine the accumulated fatigue life consumption, wherein the wind turbine and the additional wind turbine are in the same wind farm. In further embodiments, the processor may be further configured to multiply each of the operating times for each power level by the corresponding loading condition to obtain a partial fatigue life consumption; and, add each of the partial fatigue life consumptions together to obtain the accumulated fatigue life consumption of the one or more wind turbine components. It should be understood that the system may further be configured to with any of the features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
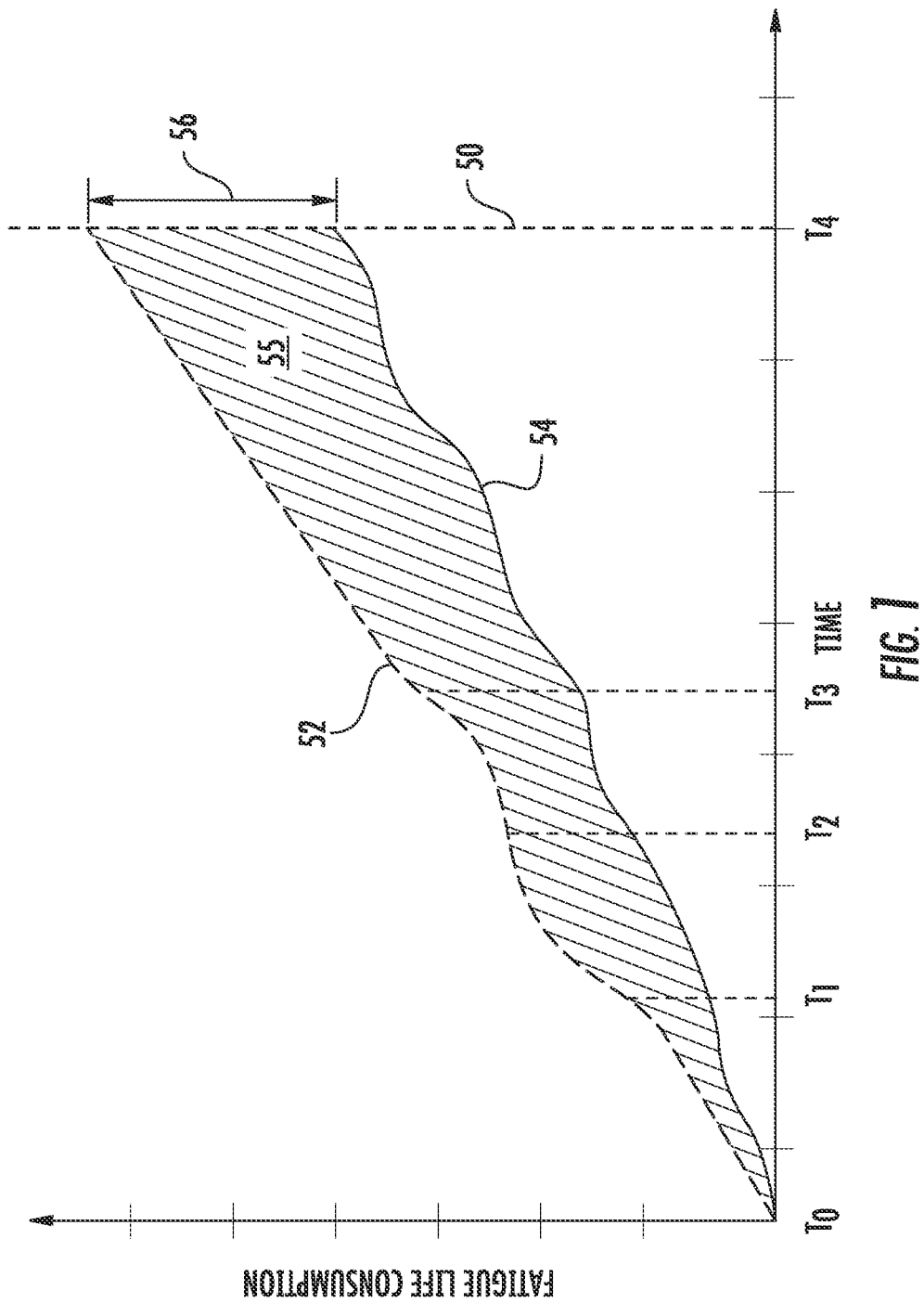
FIG. 1 illustrates a graph charting the fatigue life consumption of a wind turbine (y-axis, left) over time (x-axis)

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for operating a wind turbine. More specifically, the present disclosure estimates the fatigue life consumption of the wind turbine and/or one or more of its components based on the number of years since the wind turbine was commissioned and the operating time at different operating states (i.e. power levels). In addition, the present disclosure includes utilizes one or more wind conditions (e.g. a wind direction) to more accurately estimate the fatigue life consumption of the wind turbine and/or its various components. In one embodiment, the wind direction is a calibrated signal that ensures the true azimuth of the wind turbine is tracked. The fatigue life consumption of the wind turbine and/or one or more of its components, as referred to herein, generally refers to the fatigue life that has been consumed or exhausted by previous operation of the wind turbine and/or one of its components. More specifically, the fatigue life consumption, as well as other similar terms used herein, is defined by the American Society for Testing and Materials (ASTM) as the number of stress cycles of a specified character that a structural component sustains before a failure of the structural component of a specified nature occurs. Accordingly, a remaining fatigue life time is the fatigue life time which the wind turbine is able to consume in the future before damage of the wind turbine and/or its various components occurs. The operating time of the wind turbine refers to the number of seconds, minutes, or hours that the wind turbine has been operating a particular power level. In addition, it should be understood that the operating time may be measured in any other suitable time measurement.

Figure 2:
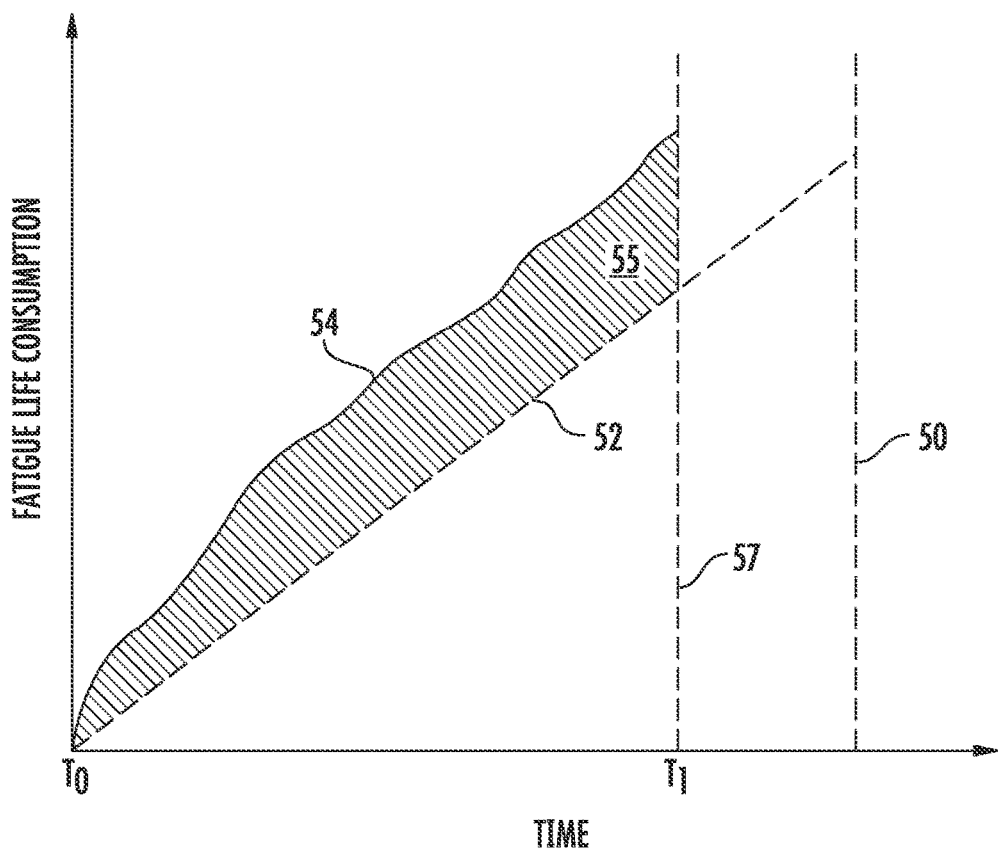
FIG. 2 illustrates another graph charting the fatigue life consumption of a wind turbine (y-axis, left) over time (x-axis)

The present system and method provides many advantages not present in the prior art. For example, the present disclosure utilizes readily available tangible data on the technical condition of the wind turbine to provide a more accurate economic value based on the remaining fatigue reserve 56 (FIG. 1) of lack thereof (FIG. 2) of the wind turbine. As such, turbine curtailment to reduce fatigue damage may be postponed to a later date or may be implemented before the end of the 20-year life of the wind turbine. For example, if the actual fatigue damage at any given time is less than the predicted damage at that time, then the current system and method may provide a higher Net Present Value (NPV). Such a situation may exist where the actual wind conditions are more benign than forecasted with more operating hours at lower production levels (i.e. idling hours) or wind directions that are connected to lower turbulence intensity. In contrast, if the actual fatigue damage at any given time is more than the predicted damage at that time, then the current system and method may remove a wind turbine from operation earlier than predicted, thereby preventing damage to the wind turbine.

Figure 3:
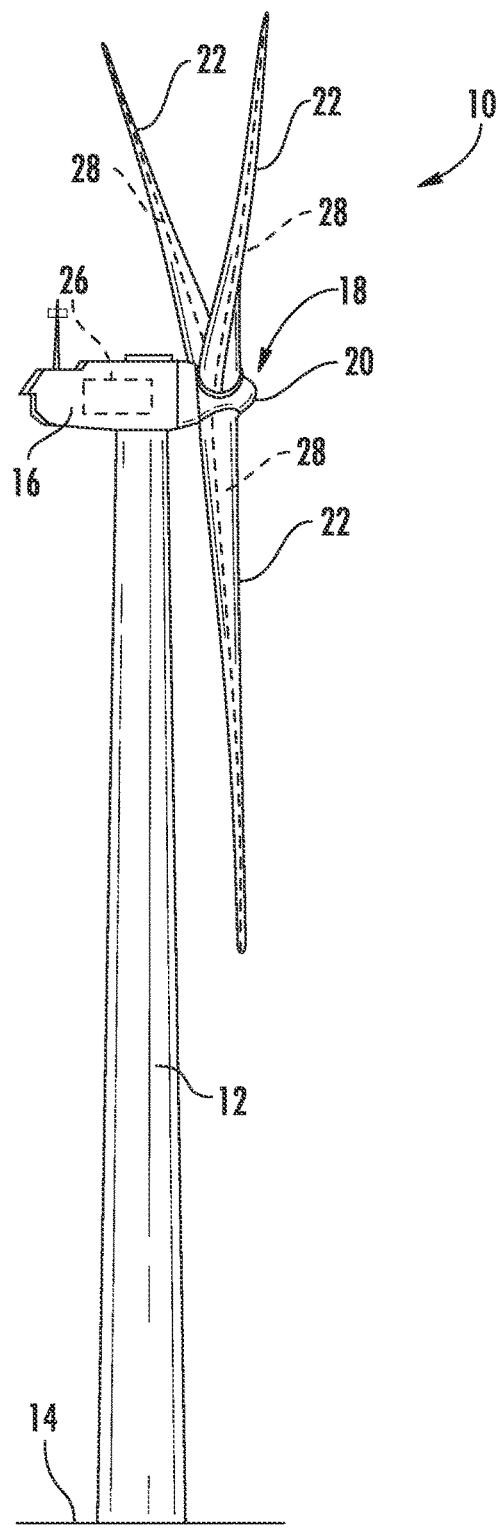
FIG. 3 illustrates a perspective view of one embodiment of a wind turbine according to the present disclosure.

Referring now to the drawings, FIG. 3 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a corrective action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes of the wind turbine 10 (e.g., start-up or shut-down sequences), de-rate the wind turbine 10, and/or control various components of the wind turbine 10. For example, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10 by adjusting an angular position of at least one rotor blade 22 relative to the wind. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Figure 4:
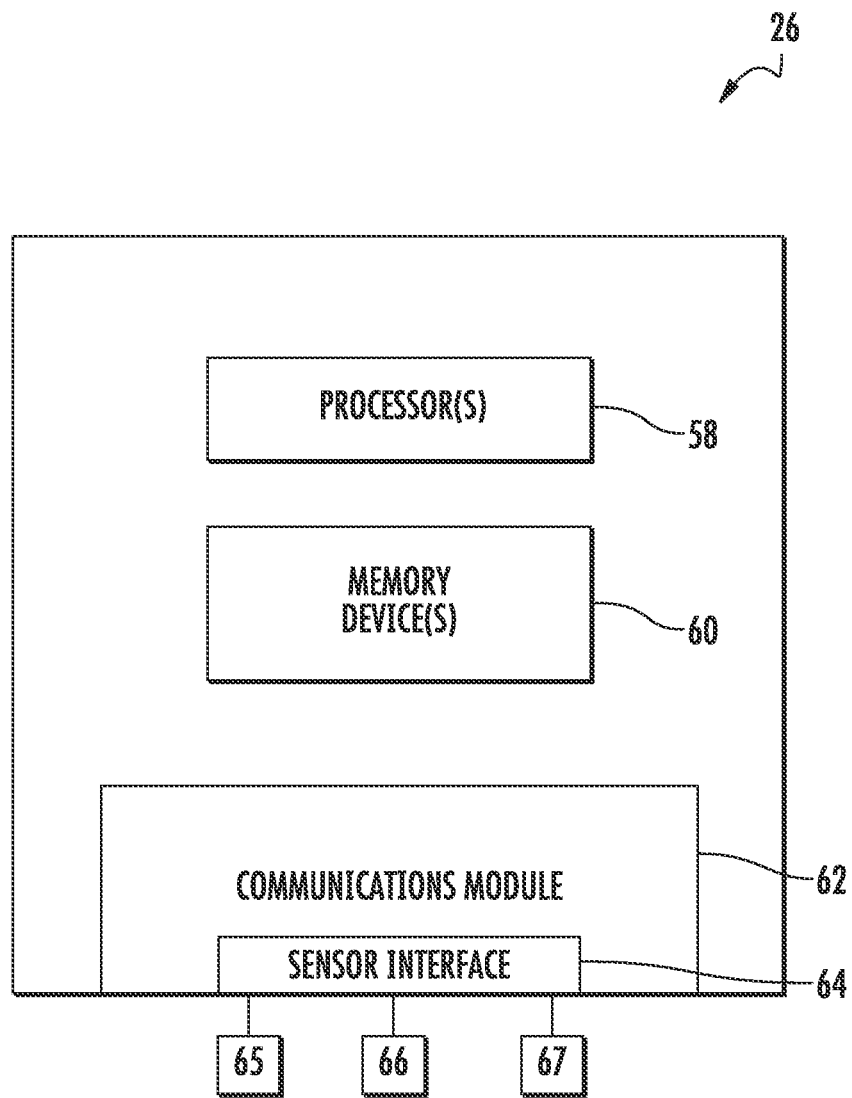
FIG. 4 illustrates a schematic view of one embodiment of suitable components that may be included within a turbine controller of the wind turbine shown in FIG. 2.

Referring now to FIG. 4, a block diagram of one embodiment of suitable components that may be included within the controller 26 is illustrated in accordance with aspects of the present subject matter. As shown, the controller 26 may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Additionally, the controller 26 may also include a communications module 62 to facilitate communications between the controller 26 and the various components of the wind turbine 10. For instance, the communications module 62 may include a sensor interface 64 (e.g., one or more analog-to-digital converters) to permit the signals transmitted by one or more sensors 65, 66, 67 to be converted into signals that can be understood and processed by the controller 26. It should be appreciated that the sensors 65, 66, 67 may be communicatively coupled to the communications module 62 using any suitable means. For example, as shown in FIG. 4, the sensors 65, 66, 67 are coupled to the sensor interface 64 via a wired connection. However, in other embodiments, the sensors 65, 66, 67 may be coupled to the sensor interface 64 via a wireless connection, such as by using any suitable wireless communications protocol known in the art. As such, the processor 58 may be configured to receive one or more signals from the sensors 65, 66, 67.

The sensors 65, 66, 67 of the wind turbine 10 may be any suitable sensors configured to measure any operating condition or wind parameter at or near the wind turbine. For example, the sensors 65, 66, 67 may include blade sensors for measuring a pitch angle of one of the rotor blades 22 or for measuring a loading acting on one of the rotor blades 22; generator sensors for monitoring the generator (e.g. torque, rotational speed, acceleration and/or the power output); and/or various wind sensors for measuring various wind parameters. Further, the sensors 65, 66, 67 may be characteristic turbulence intensity sensors, that directly or indirectly measure a characteristic turbulence intensity near the wind turbine 10. In addition, the sensors 65, 66, 67 may be located near the ground of the wind turbine, on the nacelle, or on a meteorological mast of the wind turbine. It should also be understood that any other number or type of sensors may be employed and at any location. For example, the sensors may be accelerometers, pressure sensors, angle of attack sensors, vibration sensors, MIMU sensors, camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors. It should be appreciated that, as used herein, the term "monitor" and variations thereof indicates that the various sensors of the wind turbine may be configured to provide a direct measurement of the parameters being monitored or an indirect measurement of such parameters. Thus, the sensors 65, 66, 67 may, for example, be used to generate signals relating to the parameter being monitored, which can then be utilized by the controller 26 to determine the actual condition.

As mentioned, the processor(s) 58 is configured to perform any of the steps of the operating method of the present disclosure. For example, the processor 58 is configured to determine the actual operating time for the wind turbine at multiple power levels. More specifically, the processor 58 may be configured to determine the number of operating seconds, minutes, hours, or similar that the wind turbine 10 and or its various components has operated at each of the multiple power levels. The processor 58 may also be configured to record and store the number of operating hours for each power level in the memory store 60 for later use. For example, the processor 58 may store the operating hours in one or more look-up tables (LUTs). In a further embodiment, the LUT may also include information regarding one or more wind conditions, power levels, and turbulence intensities, as will be discussed in more detail below. As such, the processor 58 may be configured to determine a corresponding wind condition acting on the wind turbine 10 during the operating time corresponding to particular power level. The processor 58 may also use data from the sensors 65, 66, 67 in combination with the LUTs to determine the corresponding wind condition(s).

The corresponding wind conditions are typically reflective of at least one of the following: wind speed, wind peaks, wind turbulence, wind gusts, wind shear, wind direction, air density, and/or similar. For example, in one embodiment, the wind condition may be reflective of a wind direction. As such, the wind direction can be used as a proxy for turbulence intensity based on a wind resource assessment report, e.g. a wind rose with turbulence intensity per sector. For example, in one embodiment, the wind direction is a calibrated signal determined to ensure the true azimuth of the wind turbine is tracked. The calibrated signal can then be linked to an average turbulence intensity in the wind depending on a sectorial terrain roughness and an altitude variation, as well as exposure to ambient wind flow or waked wind flow conditions, depending on the location of neighboring wind turbines as well as their on-line or off-line signals. Thus, the effective turbulence level and/or intensity for each wind turbine as function of wind speed for each wind sector can be stored in a turbine-specific database for each relevant scenario of neighboring wind turbines in operation. As such, the wind direction, when included in the present disclosure, is capable of providing a more accurate and reliable fatigue life consumption of the wind turbine in comparison to previous methods.

The processor 58 is also configured to estimate a loading condition acting on the wind turbine 10 at each of the multiple power levels and corresponding wind conditions. In several embodiments, the loading condition acting on the wind turbine 10 may be reflective of any of the following: a wind turbine thrust, a blade loading, a tower loading, a shaft loading, a nacelle loading, a hub loading, a pitch- or yaw-bearing loading, and/or any other suitable loading acting on the wind turbine. In addition, the loading condition may be reflective of a fatigue loading or an extreme loading acting on the wind turbine 10 and/or its various components. Fatigue loads are typically caused by the cyclic movement of the wind turbine and/or constant loads that cause damage over time, whereas extreme loads are typically caused by storm loads and/or extreme turbulence intensity levels that occur in short intervals. The probability of extreme wind conditions that cause extreme loads on the wind turbine 10 can be continuously updated based on a statistical analysis, thereby providing a more accurate estimate of the loading condition of the wind turbine 10. For example, the statistical analysis may include any of the following: the number of turbine stop events triggered by an exceedance of cut out wind conditions; vibration-induced stop events to determine the probability of high turbulence or highly unbalanced wind loading; the frequency that certain levels for displacement sensors are exceeded (or any other sensor that is part of the turbine control system); a running average of mean wind speed and/or turbulence intensity; or any other suitable indication of a high turbulence intensity.

The extreme load conditions based on the statistical analysis described herein is often different than the extreme load conditions that were determined prior to installation. As such, the controller 25 settings, e.g. a blade pitch adjustment, a change in the peak shaver profile, or a change of the controller over-speed set-points may be adjusted accordingly. If the actual loading conditions in terms of extreme loads are more benign than the controller 26 settings prior to installation, then the controller 26 setting may be adjusted to increase power capture. Alternatively, if the actual loading conditions are more turbulent than estimated prior to installation, then the controller 26 settings may be adjusted to reduce the risk of exceeding an extreme load level.

In a further embodiment, the loading conditions may be estimated by utilizing a computer-generated model having loading analysis software. For example, a three-dimensional model (e.g., a finite element model) of the wind turbine 10 may be created using suitable modeling software. In doing so, the various design and/or mechanical parameters for the wind turbine 10 and its components (e.g., geometry/shape, dimensions and material properties, such as Poison's ratio, Young's modulus and density, etc.) may be input into the model. Thereafter, using suitable load analysis software (e.g., any suitable commercially available finite element analysis software), the operation of the wind turbine 10 may be modeled based on the turbine's known and/or expected operating conditions.

For instance, in several embodiments, site-specific wind conditions, such as an average wind speed at the site (e.g., an annual average wind speed or a twenty year average wind speed), an average wind speed distribution at the site (i.e., the distribution or profile of the wind speed over an extended period of time) and/or any other suitable site-specific operating condition(s) (e.g., wind gusts and/or turbulence intensity at the site), may be used as loading inputs to accurately model the operation of the wind turbine 10 based on its known and/or expected operating conditions. For example, in one embodiment, a database of operating data may include the power output, rotor speed, wind speed, nacelle position, and ambient temperature to determine the air density based also on the altitude of the site, all corresponding to a date and time. Such a database can be used to estimate average operating conditions that more accurately reflect the operating state of the wind turbine than a single operating data point. As such, the loading conditions may be determined as a function of an average wind speed (e.g. for a particular wind bin), air density, and an average turbulence intensity as a minimum. Further, in additional embodiments, the wind speed or wind bin can be estimated using sensors or can be taken directly from an existing database. In the latter embodiment, the wind speed can be a function of a power output of the wind turbine, air density, and/or rotor blade pitch angle.

In addition, the recorded wind speed from the database can be utilized to track idling hours of the wind turbine. For example, in one embodiment, the idling hours may be determined by tracking the hours that the wind turbine operated at a wind speed below a cut-in wind speed (e.g. 3 meters/second). Knowing the idling hours of the wind turbine may also be beneficial in accurately determining the loading conditions. Further, the present disclosure may track non-available or non-operating hours and record such hours in the database for later use.

The loading conditions may then be stored in one or more LUTs for later use. For example, in one embodiment, the loading conditions for the multiple power levels and corresponding wind conditions may be generated or pre-determined prior to installation of the wind turbine 10 and stored in the one or more LUTs. Alternatively, the loading conditions for the multiple power levels and corresponding wind conditions may be generated after installation of the wind turbine 10 and stored in the one or more LUTs. In addition, the loading conditions for the multiple power levels and corresponding wind conditions may be calibrated and/or adjusted based on actual measured loads at different wind conditions on an instrumented wind turbine that is identical to or representative of the type of turbine under consideration. Accordingly, by knowing a particular power level of the wind turbine 10 and a corresponding wind direction, the loading condition may be determined from the one or more LUTs.

The various LUTs as described herein may include, but are not limited to, any of the following information: (1) pre-calculated fatigue loading conditions per component for different power levels and wind conditions, (2) representative wind conditions per wind direction, and/or (3) fatigue loading conditions per component combined with turbine position or wind direction. The above LUTs may also be combined with SCADA signals for wind velocity, and time of day and temperature to determine atmospheric stability or wind shear inflow conditions and wind farm control unit data to distinguish between waked and non-waked inflow conditions depending on the operation of neighboring turbines. As such, a higher fidelity proxy of the actual wind conditions can be determined.

In one embodiment, the one or more LUTs as described herein may also include corresponding turbulence intensities. As such, the processor 58 may be configured to estimate a turbulence intensity acting on the wind turbine 10 based on the loading condition. For example, in one embodiment, by knowing the power level and the corresponding wind direction of the wind turbine 10, the turbulence intensity may be determined from one of the LUTs of the processor 58. As different definitions of turbulence intensity are used in wind energy engineering, it is beneficial to have a consistent definition for turbulence intensity to combine LUTs with loading conditions for different power levels and wind conditions with LUTs that contain wind conditions depending on wind direction, turbine SCADA, and wind farm controller unit data. More specifically, when determining the loading condition, the particular definition used to characterize the estimated turbulence intensity level in the field should correspond to the input variable used to estimate the loading condition. For example, in various embodiments, the turbulence intensity may be defined as a characteristic turbulence intensity or a mean turbulence intensity. The characteristic turbulence intensity is the average or mean turbulence intensity plus one standard deviation. In another embodiment, the turbulence intensity may also be based at least partially on an orientation of the wind turbine 10 relative to the wind direction during the operating time. As such, the characteristic turbulence intensity yields a conservative prediction of the turbine loading in accordance with standard wind turbine load analysis. The turbulence intensity can also be indirectly measured by shaft torque sensors.

In still further embodiments, the processor 58 is configured to utilize the plurality of operating times and the loading conditions to determine the fatigue damage or accumulated fatigue life consumption of the wind turbine 10. More specifically, the processor 58 is configured to determine the accumulated fatigue life consumption for the wind turbine 10 as a function of the plurality of operating times and the loading conditions. For example, in one embodiment, the processor 58 determines the accumulated fatigue life consumption of the wind turbine 10 by multiplying each of the operating times by the corresponding loading condition for a particular power level to determine a partial fatigue life consumption for the wind turbine 10. The processor 58 can then adding each of the partial fatigue life consumptions together to obtain the accumulated fatigue life consumption.

The processor 58 may also be configured to include the turbulence intensity when estimating the accumulated fatigue life consumption of the wind turbine 10. For example, in one embodiment, by knowing either the operating time (e.g. hours) or the loading condition in combination with the power level and the wind direction, the processor 58 can determine a corresponding characteristic turbulence intensity to yield a conservative prediction of the loading experienced by the wind turbine 10.

In accordance with the fatigue life consumption determined by the processor 58, the controller 26 is configured to operate the wind turbine 10. For example, in one embodiment, if the processor 58 determines that the fatigue life consumption is less than initially estimated before installation, the controller 26 can send a signal to the wind turbine 10 to maintain a current operating state or may up-rate the wind turbine above the rated power level. In further embodiments, modifications or upgrades may be installed for the wind turbine 10 (e.g. blade extensions) that increase power capture with acceptable increases in loads based on confirmed benign operating loads compared to design load conditions. In an alternative embodiment, if the processor 58 determines that the fatigue life consumption is greater than initially estimated before installation, the controller 26 can send a signal to the wind turbine 10 to operate at a below-rated power level or to shut down such that the wind turbine 10 is not damaged. Additionally, the controller 26 may disable or soften controller settings (e.g. power curve modifications, rotor speed limits) that reduce fatigue loads to in turn enhance energy production.

Figure 5:
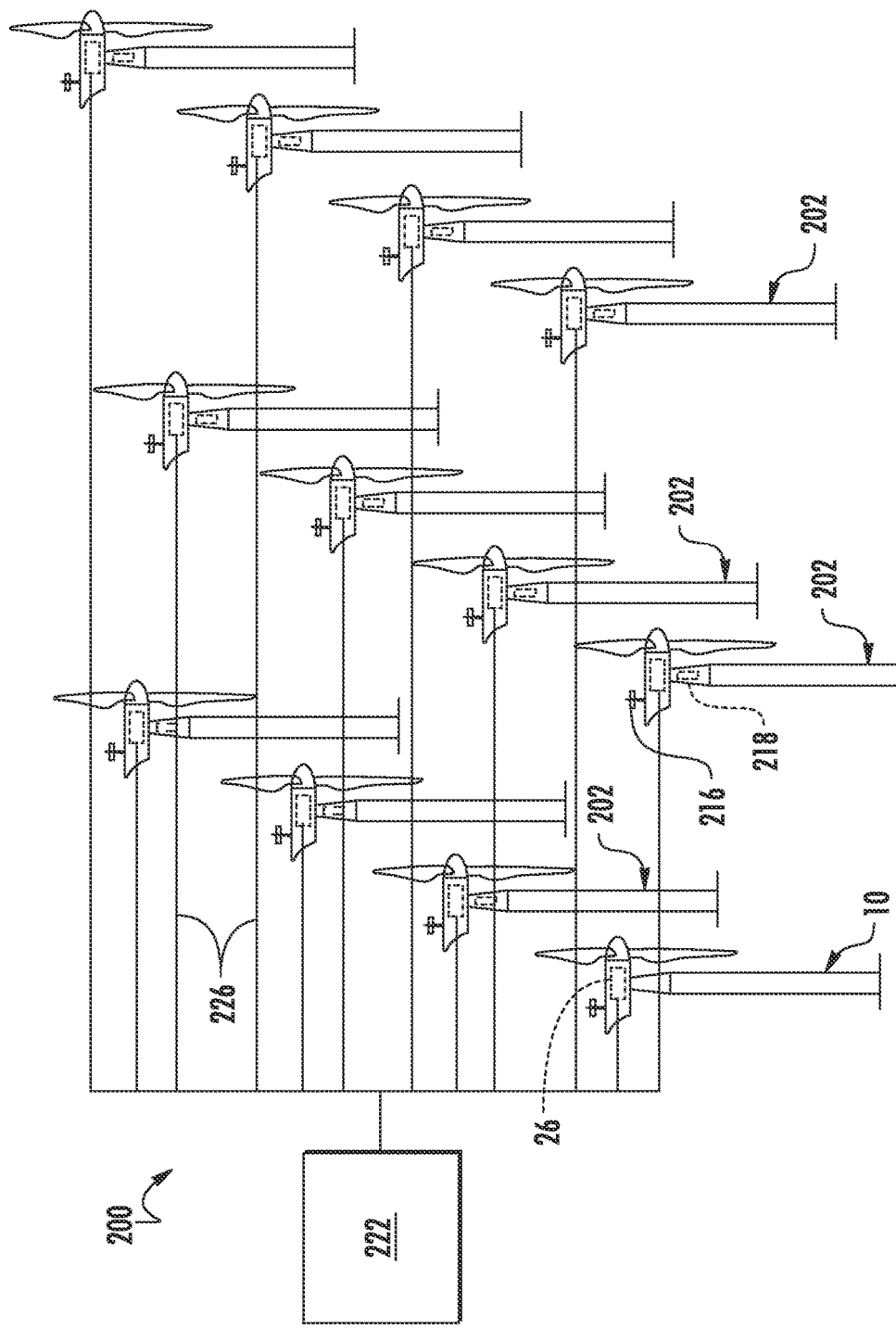
FIG. 5 illustrates a wind turbine farm control schematic according to the present disclosure; and, FIG. 6 illustrates a flow diagram of one embodiment of a method for controlling a wind turbine in accordance with aspects of the present subject matter.

Referring now to FIG. 5, the system and method as described herein may also be combined with a wind farm controller 222 of a wind farm 200. As shown, the wind farm 200 may include a plurality of wind turbines 202, including the wind turbine 10 described above. For example, as shown in the illustrated embodiment, the wind farm 200 includes twelve wind turbines, including wind turbine 10. However, in other embodiments, the wind farm 200 may include any other number of wind turbines, such as less than twelve wind turbines or greater than twelve wind turbines. In one embodiment, the controller 26 of wind turbine 10 may be communicatively coupled to the farm controller 222 through a wired connection, such as by connecting the controller 26 through suitable communicative links 226 (e.g., a suitable cable). Alternatively, the controller 26 may be communicatively coupled to the farm controller 222 through a wireless connection, such as by using any suitable wireless communications protocol known in the art.

In several embodiments, one or more of the wind turbines 202 in the wind farm 200 may include a plurality of sensors for monitoring various operating parameters/conditions of the wind turbines. For example, as shown, one of the wind turbines 202 includes a wind sensor 216, such as an anemometer or any other suitable device, configured for measuring wind speeds. As is generally understood, wind speeds may vary significantly across a wind farm 200. Thus, the wind sensor(s) 216 may allow for the local wind speed at each wind turbine 202 to be monitored. In addition, the wind turbine 202 may also include an additional sensor 218. For instance, the sensors 218 may be configured to monitor electrical properties of the output of the generator of each wind turbine 202, such as current sensors, voltage sensors, temperature sensors, or power monitors that monitor power output directly based on current and voltage measurements. Alternatively, the sensors 218 may comprise any other sensors that may be utilized to monitor the power output of a wind turbine 202. It should also be understood that the wind turbines 202 in the wind farm 200 may include any other suitable sensor known in the art for measuring and/or monitoring wind conditions and/or wind turbine conditions. For example, in one embodiment, the sensors 218 may be characteristic turbulence intensity sensors, that directly or indirectly measure a characteristic turbulence intensity near the wind turbine 10.

As such, the method of determining the estimated fatigue life consumption as described above may be calibrated using one of the wind turbines 202 in the wind farm 200 or an adjacent wind farm having a plurality of sensors installed therein. Utilizing the plurality of sensors from the additional wind turbine 202 is sometimes referred to in the art as the "flight leader" or "flag ship" concept. Such a wind turbine 200 may be proximal to permanent metrology instruments at the wind farm. Further, although each wind turbine installed within the wind farm 200 may have the exact same design specifications, the maximum power output for each wind turbine may vary due to varying operating conditions. For example, wind turbines located on the left side of a field may be subjected to lower average wind speeds and/or lower wind distributions than wind turbines located on the right side of the field (e.g., due to terrain differences, such as hills, etc.). As a result, the loading analysis may indicate that the wind turbines on the left side of the field have a higher maximum power output than the wind turbines on the right side of the field due to the lower loads acting on such wind turbines. Similarly, wind turbines located downstream of other wind turbines may be subject to vastly different operating conditions than the upstream wind turbines and, thus, the maximum power outputs may differ between the upstream and downstream wind turbines. Accordingly, one benefit of calibrating the estimated fatigue life consumption of the particular wind turbine 10 by using an additional wind turbine 202 having sensors configured therein to measure actual loads is that the method can provide a more accurate and reliable estimation of the actual fatigue damage. It should be understood that the wind turbine 202 may be located in the wind farm 200 or elsewhere as long as the additional wind turbine 202 is of the same type of turbine as the wind turbine 10 or representative thereof. For example, the wind turbine 202 may have a different hub height than the wind turbine 10, but can still allow for a calibration of up-tower load sensors if the wind turbines 10, 202 are the same type.

In further embodiments, calibration of the estimated fatigue life consumption may require detailed analysis to determine the cause of the offset between actual and estimated fatigue loading. For example, in one embodiment, the offset between the actual and estimated fatigue loading may be attributable to a systematic error in the database with pre-calculated loading conditions for a particular wind speed and turbulence level. In another embodiment, the offset between the actual and estimated fatigue loading may be attributable to an error in the database with pre-calculated turbulence levels for each wind direction. In addition, calibration of the estimated fatigue life consumption may be based on the physical condition of the wind turbine and/or from field evaluation.

Figure 6:
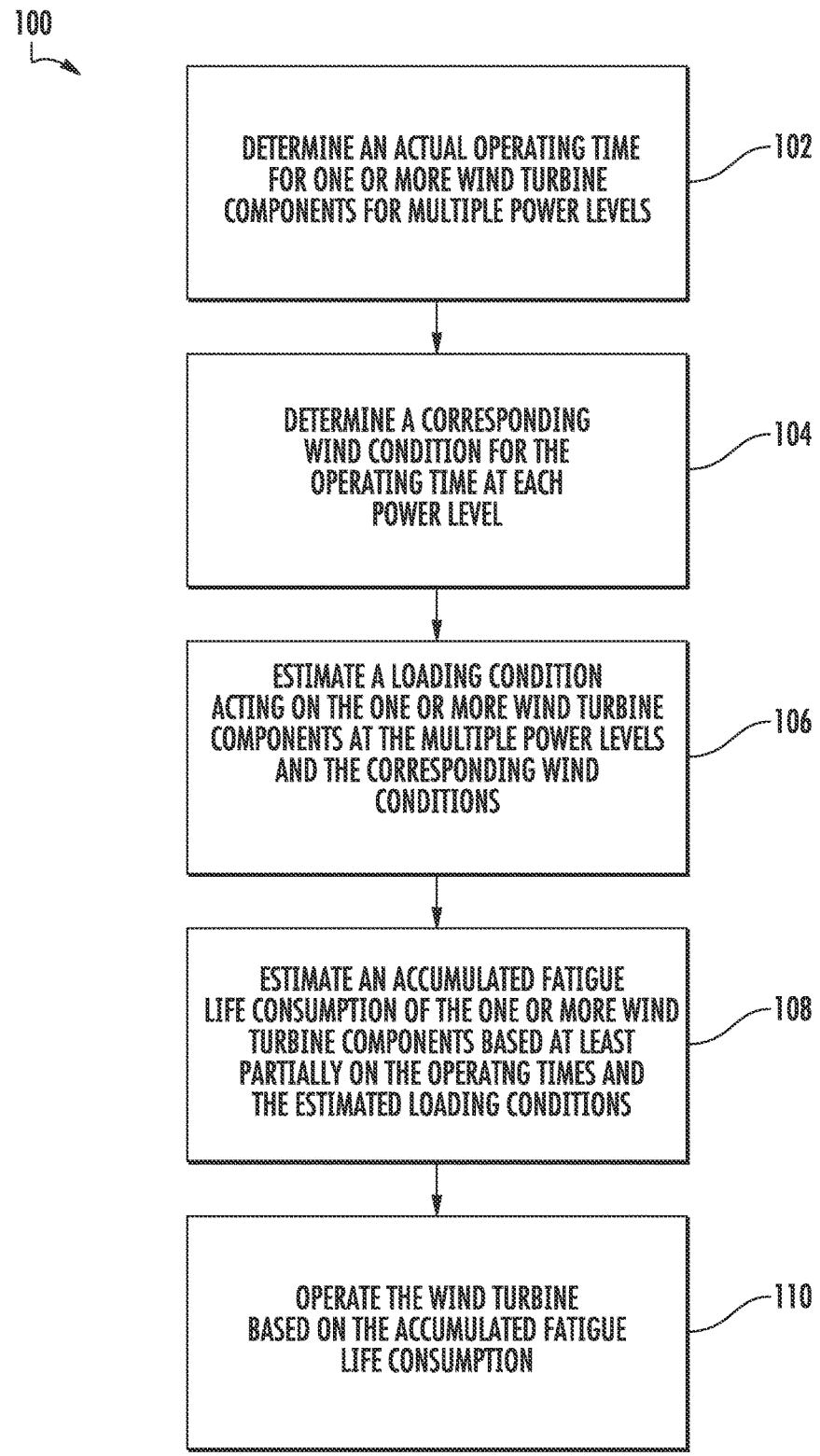

Referring now to FIG. 6, a flow diagram of one embodiment of a method 100 for operating the wind turbine 10 is illustrated in accordance with aspects of the present subject matter. The method 100 may include step 102 of determining an actual operating time for the wind turbine at multiple power levels. The method 100 may also include step 104 of determining a corresponding wind condition for the operating time at each power level. The method 100 may also include step 106 of determining a loading condition acting on the wind turbine at the multiple power levels and the corresponding wind conditions. As such, the method 100 is capable of estimating an accumulated fatigue life consumption of the wind turbine based at least partially on the operating times and the loading conditions (step 108). The method 100 may also include the step 100 of operating the wind turbine based on the accumulated fatigue life consumption. It should be understood that the method 100 may also include any other steps as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine, the method comprising:
   determining an actual operating time for one or more wind turbine components at multiple output power levels of the wind turbine, wherein determining the actual operating time comprises determining an elapsed number of operating seconds, minutes, or hours that the one or more wind turbine components has operated at each of the multiple output power levels;
   determining a corresponding wind direction for each of the actual operating times at each of the multiple output power levels of the wind turbine;
   storing the corresponding wind directions with the actual operating times together in a look-up table;
   selecting, from the look-up table, a corresponding loading condition acting on the one or more wind turbine components at each of the multiple output power levels of the wind turbine with the corresponding wind directions;
   estimating an accumulated fatigue life consumption of the one or more wind turbine components based at least partially on the actual operating times and the estimated loading conditions; and,
   operating the wind turbine at one or more output power levels based on the accumulated fatigue life consumption.

2. The method of claim 1, wherein one or more of the loading conditions are determined prior to installation of the wind turbine, after installation of the wind turbine, or calibrated based on actual measured loads at different wind conditions.

3. The method of claim 1, wherein estimating determining the loading condition acting on the one or more wind turbine components at the multiple output power levels and the corresponding wind directions further comprises utilizing one or more look-up tables, wherein the one or more look-up tables comprises operating data of the wind turbine.

4. The method of claim 1, further comprising determining a turbulence intensity acting on the one or more wind turbine components based at least partially on one of the multiple output power levels of the wind turbine and the corresponding wind directions, and estimating the accumulated fatigue life consumption based on the turbulence intensity.

5. The method of claim 1, further comprising tracking a plurality of loading conditions over a predetermined time period via one or more sensors, determining a variance between the tracked plurality of loading conditions and the estimated loading condition, and calibrating the estimated loading condition to reflect the variance, wherein the variance is reflective of at least one of a fatigue load or an extreme load acting on the wind turbine.

6. The method of claim 1, wherein the loading condition acting on the one or more wind turbine components is reflective of at least one of the following: a wind turbine thrust, a blade loading, a tower loading, a shaft loading, a nacelle loading, a pitch bearing loading, a yaw bearing loading, a hub loading, or a pitch- or yaw-bearing loading.

7. The method of claim 1, wherein determining the accumulated fatigue life consumption of the one or more wind turbine components based at least partially on the operating time and the loading condition further comprises multiplying the operating time and the loading condition.

8. The method of claim 1, wherein determining the accumulated fatigue life consumption of the one or more wind turbine components further comprises utilizing sensor data from at least one of the wind turbine or an additional wind turbine in the same wind farm or an adjacent wind farm.

9. The method of claim 8, further comprising calibrating the sensor data from the additional wind turbine.

10. The method of claim 1, wherein determining the accumulated fatigue life consumption for the one or more wind turbine components based at least partially on the operating times and the loading conditions further comprises:
multiplying each of the operating times for each output power level of the wind turbine by the corresponding loading condition to obtain a partial fatigue life consumption; and,
adding each of the partial fatigue life consumptions together to obtain the accumulated fatigue life consumption.

11. A method for determining fatigue life consumption of one or more wind turbine components, the method comprising:
determining an actual operating time for one or more wind turbine components at multiple output power levels of the wind turbine, wherein determining the actual operating time comprises determining an elapsed number of operating seconds, minutes, or hours that the one or more wind turbine components has operated at each of the multiple output power levels;
determining a corresponding wind condition for each of the operating times at each of the multiple output power levels of the wind turbine;
storing the corresponding wind conditions with the actual operating times together in a look-up table;
selecting, from the look-up table, a corresponding loading condition acting on the one or more wind turbine components at each of the multiple output power levels of the wind turbine and the corresponding wind conditions;
estimating an accumulated fatigue life consumption for the one or more wind turbine components based on the actual operating times and the loading conditions; and
operating the wind turbine at one or more output power levels based on the accumulated fatigue life consumption.

12. A system for operating a wind turbine, the system comprising:
a processor configured to:
determine an elapsed number of operating seconds, minutes, or hours that one or more wind turbine components has operated at each of multiple output power levels of the wind turbine;
determine at least one corresponding wind direction for each of the elapsed operating seconds, minutes, or hours at each output power level of the wind turbine;
store the corresponding wind directions with the elapsed number of operating seconds, minutes, or hours together in a look-up table;
select, from the look-up table, a loading condition acting on the one or more wind turbine components at the multiple output power levels of the wind turbine based on and the corresponding wind conditions; and,
estimate an accumulated fatigue life consumption of the one or more wind turbine components as a function of the operating times and the loading conditions; and,
a controller communicatively coupled to the processor, the controller configured to operate the wind turbine at one or more output power levels based on the accumulated fatigue life consumption.

13. The system claim 12, wherein the processor is further configured to:
estimate a turbulence intensity acting on the one or more wind turbine components based at least partially on one of the multiple output power levels of the wind turbine and the corresponding wind direction; and,
estimate the accumulated fatigue life consumption based on the turbulence intensity.

14. The system of claim 12, further comprising tracking a plurality of loading conditions over a predetermined time period via one or more sensors, determining a variance between the tracked plurality of loading conditions and the estimated loading condition, and calibrating the estimated loading condition to reflect the variance, wherein the variance is reflective of at least one of a fatigue load or an extreme load acting on the wind turbine.

15. The system of claim 12, wherein the loading condition acting on the one or more wind turbine components is reflective of at least one of the following: a wind turbine thrust, a blade loading, a tower loading, a shaft loading, a nacelle loading, a hub loading, or a pitch-or yaw-bearing loading.

16. The system of claim 12, wherein the processor is further configured to determine the accumulated fatigue life consumption of the one or more wind turbine components as a function of the operating time and the loading condition by multiplying the operating time and the loading condition.

17. The system of claim 12, wherein the processor is further configured to utilize at least one of sensor data or operating data from an additional wind turbine to determine the accumulated fatigue life consumption, wherein the wind turbine and the additional wind turbine are in the same wind farm or an adjacent wind farm.

18. The system of claim 12, wherein the processor is further configured to:
multiply each of the operating times for each power level by the corresponding loading condition to obtain a partial fatigue life consumption; and,
add each of the partial fatigue life consumptions together to obtain the accumulated fatigue life consumption.

* * * * *